(12) United States Patent
Swoboda

(10) Patent No.: US 8,627,145 B2
(45) Date of Patent: Jan. 7, 2014

(54) HIGH VOLUME RECORDING OF INSTRUMENTATION DATA VARYING INSTRUMENTATION VOLUMES TO PREVENT DATA LOSS

(75) Inventor: Gary L. Swoboda, Sugarland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 12/974,619

(22) Filed: Dec. 21, 2010

(65) Prior Publication Data

US 2013/0151901 A1 Jun. 13, 2013

Related U.S. Application Data

(60) Provisional application No. 61/289,509, filed on Dec. 23, 2009.

(51) Int. Cl.
*G06F 11/00* (2006.01)

(52) U.S. Cl.
USPC .......................................................... 714/30

(58) Field of Classification Search
USPC .......................................................... 714/30
See application file for complete search history.

(56) References Cited

U.S. PATENT DOCUMENTS

| | | | |
|---|---|---|---|
| 6,397,354 B1 * | 5/2002 | Ertekin | 714/34 |
| 7,555,682 B2 * | 6/2009 | Swoboda | 714/45 |
| 7,627,784 B1 * | 12/2009 | Allen et al. | 714/30 |
| 8,407,529 B2 * | 3/2013 | Horley et al. | 714/45 |
| 2011/0107146 A1 * | 5/2011 | Bose et al. | 714/32 |

* cited by examiner

*Primary Examiner* — Bryce Bonzo
(74) *Attorney, Agent, or Firm* — Lawrence J. Bassuk; Wade J. Brady, III; Frederick J. Telecky, Jr.

(57) ABSTRACT

This invention is an apparatus and method for monitoring an electronic apparatus. At least one capture unit captures data to be monitored. A repeater corresponding to each capture unit repeats the captured data. A first-in-first-out buffer corresponding to each capture unit temporarily stores the captured data. The buffered data supplies a utilization unit. Captured data may be merged after repeating. The capture unit may be in a different voltage domain than the repeater, buffer and utilization unit.

7 Claims, 7 Drawing Sheets

HIGH VOLUME RECORDING OF INSTRUMENTATION DATA VARYING INSTRUMENTATION VOLUMES TO PREVENT DATA LOSS

CLAIM OF PRIORITY

This application claims priority under 35 U.S.C. 119(e)(1) to U.S. Provisional Application No. 61/289,509 filed Dec. 23, 2009.

TECHNICAL FIELD OF THE INVENTION

The technical field of this invention is emulation and debug of electronic systems.

BACKGROUND OF THE INVENTION

Advanced wafer lithography and surface-mount packaging technology are integrating increasingly complex functions at both the silicon and printed circuit board level of electronic design. Diminished physical access to circuits for test and emulation is an unfortunate consequence of denser designs and shrinking interconnect pitch. Designed-in testability is needed so the finished product is both controllable and observable during test and debug. Any manufacturing defect is preferably detectable during final test before a product is shipped. This basic necessity is difficult to achieve for complex designs without taking testability into account in the logic design phase so automatic test equipment can test the product.

In addition to testing for functionality and for manufacturing defects, application software development requires a similar level of simulation, observability and controllability in the system or sub-system design phase. The emulation phase of design should ensure that a system of one or more ICs (integrated circuits) functions correctly in the end equipment or application when linked with the system software. With the increasing use of ICs in the automotive industry, telecommunications, defense systems, and life support systems, thorough testing and extensive real-time debug becomes a critical need.

Functional testing, where the designer generates test vectors to ensure conformance to specification, still remains a widely used test methodology. For very large systems this method proves inadequate in providing a high level of detectable fault coverage. Automatically generated test patterns are desirable for full testability, and controllability and observability. These are key goals that span the full hierarchy of test from the system level to the transistor level.

Another problem in large designs is the long time and substantial expense involved in design for test. It would be desirable to have testability circuitry, system and methods that are consistent with a concept of design-for-reusability. n this way, subsequent devices and systems can have a low marginal design cost for testability, simulation and emulation by reusing the testability, simulation and emulation circuitry, systems and methods that are implemented in an initial device. Without a proactive testability, simulation and emulation plan, a large amount of subsequent design time would be expended on test pattern creation and upgrading.

Even if a significant investment were made to design a module to be reusable and to fully create and grade its test patterns, subsequent use of a module may bury it in application specific logic. This would make its access difficult or impossible. Consequently, it is desirable to avoid this pitfall.

The advances of IC design are accompanied by decreased internal visibility and control, reduced fault coverage and reduced ability to toggle states, more test development and verification problems, increased complexity of design simulation and continually increasing cost of CAD (computer aided design) tools. In the board design the side effects include decreased register visibility and control, complicated debug and simulation in design verification, loss of conventional emulation due to loss of physical access by packaging many circuits in one package, increased routing complexity on the board, increased costs of design tools, mixed-mode packaging, and design for produceability. In application development, some side effects are decreased visibility of states, high speed emulation difficulties, scaled time simulation, increased debugging complexity, and increased costs of emulators. Production side effects involve decreased visibility and control, complications in test vectors and models, increased test complexity, mixed-mode packaging, continually increasing costs of automatic test equipment and tighter tolerances.

Emulation technology utilizing scan based emulation and multiprocessing debug was introduced more than 10 years ago. In 1988, the change from conventional in circuit emulation to scan based emulation was motivated by design cycle time pressures and newly available space for on-chip emulation. Design cycle time pressure was created by three factors. Higher integration levels, such as increased use of on-chip memory, demand more design time. Increasing clock rates mean that emulation support logic causes increased electrical intrusiveness. More sophisticated packaging causes emulator connectivity issues. Today these same factors, with new twists, are challenging the ability of a scan based emulator to deliver the system debug facilities needed by today's complex, higher clock rate, highly integrated designs. The resulting systems are smaller, faster, and cheaper. They have higher performance and footprints that are increasingly dense. Each of these positive system trends adversely affects the observation of system activity, the key enabler for rapid system development. The effect is called "vanishing visibility."

FIG. 1 illustrates the trend in visibility and control over time and greater system integration in accordance with the prior art. Application developers prefer the optimum visibility level illustrated in FIG. 1. This optimum visibility level provides visibility and control of all relevant system activity. The steady progression of integration levels and increases in clock rates steadily decrease the actual visibility and control available over time. These forces create a visibility and control gap, the difference between the optimum visibility and control level and the actual level available. Over time, this gap will widen. Application development tool vendors are striving to minimize the gap growth rate. Development tools software and associated hardware components must do more with less resources and in different ways. Tackling this ease of use challenge is amplified by these forces.

With today's highly integrated System-On-a-Chip (SOC) technology, the visibility and control gap has widened dramatically over time. Traditional debug options such as logic analyzers and partitioned prototype systems are unable to keep pace with the integration levels and ever increasing clock rates of today's systems. As integration levels increase, system buses connecting numerous subsystem components move on chip, denying traditional logic analyzers access to these buses. With limited or no significant bus visibility, tools like logic analyzers cannot be used to view system activity or provide the trigger mechanisms needed to control the system under development. A loss of control accompanies this loss in visibility, as it is difficult to control things that are not accessible.

To combat this trend, system designers have worked to keep these buses exposed. Thus the system components were built in a way that enabled the construction of prototyping systems with exposed buses. This approach is also under siege from the ever-increasing march of system clock rates. As the central processing unit (CPU) clock rates increase, chip to chip interface speeds are not keeping pace. Developers find that a partitioned system's performance does not keep pace with its integrated counterpart, due to interface wait states added to compensate for lagging chip to chip communication rates. At some point, this performance degradation reaches intolerable levels and the partitioned prototype system is no longer a viable debug option. In the current era production devices must serve as the platform for application development.

Increasing CPU clock rates are also limiting availability of other simple visibility mechanisms. Since the CPU clock rates can exceed the maximum I/O state rates, visibility ports exporting information in native form can no longer keep up with the CPU. On-chip subsystems are also operated at clock rates that are slower than the CPU clock rate. This approach may be used to simplify system design and reduce power consumption. These developments mean simple visibility ports can no longer be counted on to deliver a clear view of CPU activity. As visibility and control diminish, the development tools used to develop the application become less productive. The tools also appear harder to use due to the increasing tool complexity required to maintain visibility and control. The visibility, control, and ease of use issues created by systems-on-a-chip tend to lengthen product development cycles.

Even as the integration trends present developers with a tough debug environment, they also present hope that new approaches to debug problems will emerge. The increased densities and clock rates that create development cycle time pressures also create opportunities to solve them. On-chip, debug facilities are more affordable than ever before. As high speed, high performance chips are increasingly dominated by very large memory structures, the system cost associated with the random logic accompanying the CPU and memory subsystems is dropping as a percentage of total system cost. The incremental cost of several thousand gates is at an all time low. Circuits of this size may in some cases be tucked into a corner of today's chip designs. The incremental cost per pin in today's high density packages has also dropped. This makes it easy to allocate more pins for debug. The combination of affordable gates and pins enables the deployment of new, on-chip emulation facilities needed to address the challenges created by systems-on-a-chip.

When production devices also serve as the application debug platform, they must provide sufficient debug capabilities to support time to market objectives. Since the debugging requirements vary with different applications, it is highly desirable to be able to adjust the on-chip debug facilities to balance time to market and cost needs. Since these on-chip capabilities affect the chip's recurring cost, the scalability of any solution is of primary importance. "Pay only for what you need" should be the guiding principle for on-chip tools deployment. In this new paradigm, the system architect may also specify the on-chip debug facilities along with the remainder of functionality, balancing chip cost constraints and the debug needs of the product development team.

FIG. 2 illustrates a prior art emulator system 100 including four emulator components. These four components are: a debugger application program 110; a host computer 120; an emulation controller 130; and on-chip debug facilities 140. FIG. 2 illustrates the connections of these components. Host computer 120 is connected to an emulation controller 130 external to host 120. Emulation controller 130 is also connected to target system 140. The user preferably controls the target application on target system 140 through debugger application program 110.

Host computer 120 is generally a personal computer. Host computer 120 provides access the debug capabilities through emulator controller 130. Debugger application program 110 presents the debug capabilities in a user-friendly form via host computer 120. The debug resources are allocated by debug application program 110 on an as needed basis, relieving the user of this burden. Source level debug utilizes the debug resources, hiding their complexity from the user. Debugger application program 110 together with the on-chip trace and triggering facilities provide a means to select, record, and display chip activity of interest. Trace displays are automatically correlated to the source code that generated the trace log. The emulator provides both the debug control and trace recording function.

The debug facilities are preferably programmed using standard emulator debug accesses through a JTAG or similar serial debug interface. Since pins are at a premium, the preferred embodiment of the invention provides for the sharing of the debug pin pool by trace, trigger, and other debug functions with a small increment in silicon cost. Fixed pin formats may also be supported. When the pin sharing option is deployed, the debug pin utilization is determined at the beginning of each debug session before target system 140 is directed to run the application program. This maximizes the trace export bandwidth. Trace bandwidth is maximized by allocating the maximum number of pins to trace.

The debug capability and building blocks within a system may vary. Debugger application program 100 therefore establishes the configuration at runtime. This approach requires the hardware blocks to meet a set of constraints dealing with configuration and register organization. Other components provide a hardware search capability designed to locate the blocks and other peripherals in the system memory map. Debugger application program 110 uses a search facility to locate the resources. The address where the modules are located and a type ID uniquely identifies each block found. Once the IDs are found, a design database may be used to ascertain the exact configuration and all system inputs and outputs.

Host computer 120 generally includes at least 64 Mbytes of memory and is capable of running Windows 95, SR-2, Windows NT, or later versions of Windows. Host computer 120 must support one of the communications interfaces required by the emulator. These may include: Ethernet 10T and 100T, TCP/IP protocol; Universal Serial Bus (USB); Firewire IEEE 1394; and parallel port such as SPP, EPP and ECP.

Host computer 120 plays a major role in determining the real-time data exchange bandwidth. First, the host to emulator communication plays a major role in defining the maximum sustained real-time data exchange bandwidth because emulator controller 130 must empty its receive real-time data exchange buffers as fast as they are filled. Secondly, host computer 120 originating or receiving the real-time data exchange data must have sufficient processing capacity or disc bandwidth to sustain the preparation and transmission or processing and storing of the received real-time data exchange data. A state of the art personal computer with a Firewire communication channel (IEEE 1394) is preferred to obtain the highest real-time data exchange bandwidth. This bandwidth can be as much as ten times greater performance than other communication options.

Emulation controller 130 provides a bridge between host computer 120 and target system 140. Emulation controller 130 handles all debug information passed between debugger application program 110 running on host computer 120 and a target application executing on target system 140. A presently preferred minimum emulator configuration supports all of the following capabilities: real-time emulation; real-time data exchange; trace; and advanced analysis.

Emulation controller 130 preferably accesses real-time emulation capabilities such as execution control, memory, and register access via a 3, 4, or 5 bit scan based interface. Real-time data exchange capabilities can be accessed by scan or by using three higher bandwidth real-time data exchange formats that use direct target to emulator connections other than scan. The input and output triggers allow other system components to signal the chip with debug events and vice-versa. Bit I/O allows the emulator to stimulate or monitor system inputs and outputs. Bit I/O can be used to support factory test and other low bandwidth, non-time-critical emulator/target operations. Extended operating modes are used to specify device test and emulation operating modes. Emulator controller 130 is partitioned into communication and emulation sections. The communication section supports host communication links while the emulation section interfaces to the target, managing target debug functions and the device debug port. Emulation controller 130 communicates with host computer 120 using one of industry standard communication links outlined earlier herein. The host to emulator connection is established with off the shelf cabling technology. Host to emulator separation is governed by the standards applied to the interface used.

Emulation controller 130 communicates with the target system 140 through a target cable or cables. Debug, trace, triggers, and real-time data exchange capabilities share the target cable, and in some cases, the same device pins. More than one target cable may be required when the target system 140 deploys a trace width that cannot be accommodated in a single cable. All trace, real-time data exchange, and debug communication occurs over this link. Emulator controller 130 preferably allows for a target to emulator separation of at least two feet. This emulation technology is capable of test clock rates up to 50 MHZ and trace clock rates from 200 to 300 MHZ, or higher. Even though the emulator design uses techniques that should relax target system 140 constraints, signaling between emulator controller 130 and target system 140 at these rates requires design diligence. This emulation technology may impose restrictions on the placement of chip debug pins, board layout, and requires precise pin timings. On-chip pin macros are provided to assist in meeting timing constraints.

The on-chip debug facilities offer the developer a rich set of development capability in a two tiered, scalable approach. The first tier delivers functionality utilizing the real-time emulation capability built into a CPU's mega-modules. This real-time emulation capability has fixed functionality and is permanently part of the CPU while the high performance real-time data exchange, advanced analysis, and trace functions are added outside of the core in most cases. The capabilities are individually selected for addition to a chip. The addition of emulation peripherals to the system design creates the second tier functionality. A cost-effective library of emulation peripherals contains the building blocks to create systems and permits the construction of advanced analysis, high performance real-time data exchange, and trace capabilities. In the preferred embodiment five standard debug configurations are offered, although custom configurations are also supported. The specific configurations are covered later herein.

Clock rates of cores generating program and data trace have increased. This generates higher trace information volumes. A sophisticated trace protocol must be used in most cases to describe the program activity. This protocol may generate large volumes of data over short periods. Current trace architectures merge this data with other sources such as other cores as it is generated, with this logic operating at a lower frequency than the cores. When instantaneous volumes occur, the system is incapable of handling this volume and data is lost. Additionally units generating trace data should not have to consider the data volume of other units they may be deployed with. This would be the case where units would locally buffer data. This buffering would increase the power consumption of the chip as this buffering may be located in an area that prevents them from being turned off to conserve power.

SUMMARY OF THE INVENTION

This invention is an apparatus and method for monitoring an electronic apparatus. At least one capture unit captures data to be monitored. A repeater corresponding to each capture unit repeats the captured data. A first-in-first-out buffer corresponding to each capture unit temporarily stores the captured data. The buffered data supplies a utilization unit. Captured data may be merged after repeating. The capture unit may be in a different voltage domain than the repeater, buffer and utilization unit.

The repeater enables the buffer to be remote from high speed logic generating the captured data. This permits a higher operating frequency at high speed logic where interconnect dominates the operating frequency and adding area increases interconnect length. The buffers reduce or eliminate loss of data. The remote location of the buffers minimizes impact on the high speed logic operating frequency.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
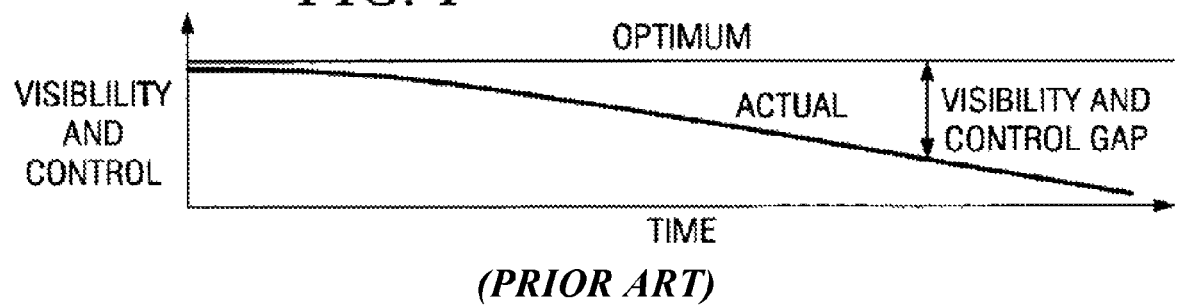
FIG. 1 illustrates the visibility and control of typical integrated circuits as a function of time due to increasing system integration.
Figure 2:
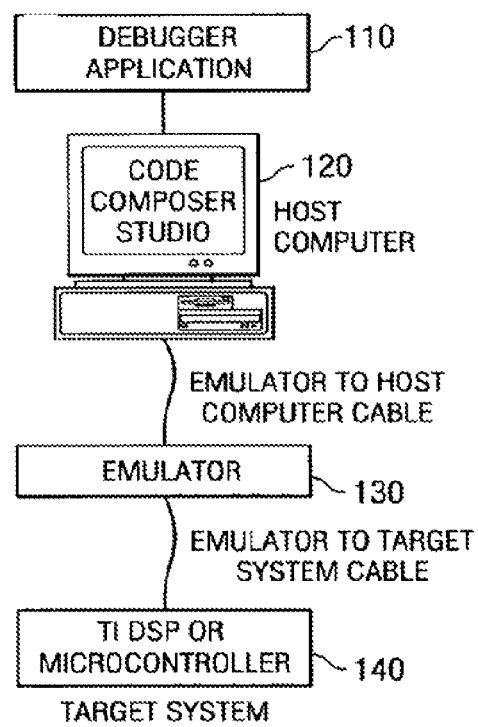
FIG. 2 illustrates a prior art emulation system to which this invention is applicable.
Figure 3:
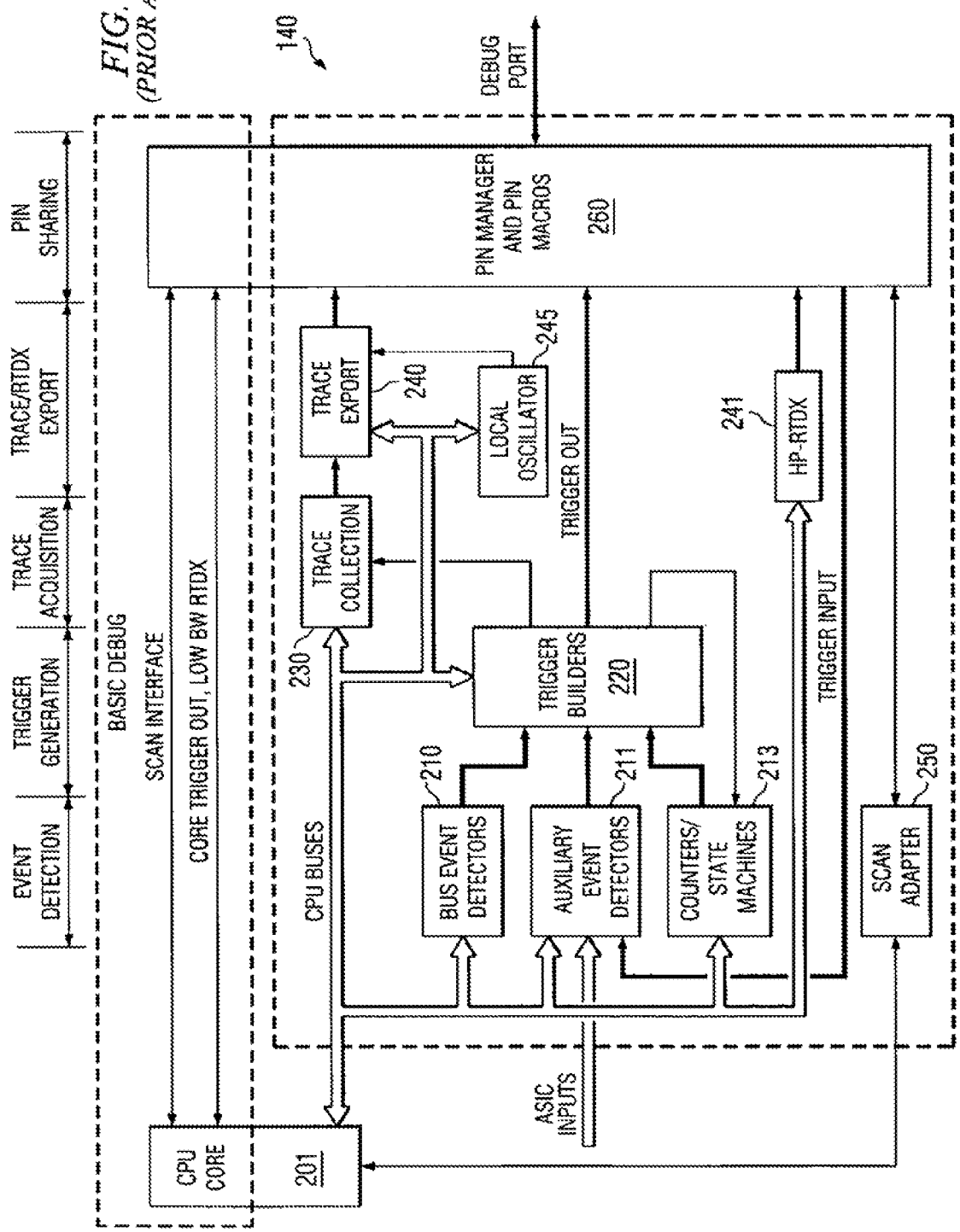
FIG. 3 illustrates in block diagram form a typical integrated circuit employing configurable emulation capability of the prior art.

FIG. 3 illustrates an example of one on-chip debug architecture embodying target system 140. The architecture uses several module classes to create the debug function. One of these classes is event detectors including bus event detectors 210, auxiliary event detectors 211 and counters/state machines 213. A second class of modules is trigger generators including trigger builders 220. A third class of modules is data acquisition including trace collection 230 and formatting. A fourth class of modules is data export including trace export 240, and real-time data exchange export 241. Trace export 240 is controlled by clock signals from local oscillator 245. Local oscillator 245 will be described in detail below. A final class of modules is scan adaptor 250, which interfaces scan input/output to CPU core 201. Final data formatting and pin selection occurs in pin manager and pin micros 260.

The size of the debug function and its associated capabilities for any particular embodiment of a system-on-chip may be adjusted by either deleting complete functions or limiting the number of event detectors and trigger builders deployed. Additionally, the trace function can be incrementally increased from program counter trace only to program counter and data trace along with ASIC and CPU generated data. The real-time data exchange function may also be optionally deployed. The ability to customize on-chip tools changes the application development paradigm. Historically, all chip designs with a given CPU core were limited to a fixed set of debug capability. Now, an optimized debug capability is available for each chip design. This paradigm change gives system architects the tools needed to manage product development risk at an affordable cost. Note that the same CPU core may be used with differing peripherals with differing pin outs to embody differing system-on-chip products. These differing embodiments may require differing debug and emulation resources. The modularity of this invention permits each such embodiment to include only the necessary debug and emulation resources for the particular system-on-chip application.

The real-time emulation debug infrastructure component is used to tackle basic debug and instrumentation operations related to application development. It contains all execution control and register visibility capabilities and a minimal set of real-time data exchange and analysis such as breakpoint and watchpoint capabilities. These debug operations use on-chip hardware facilities to control the execution of the application and gain access to registers and memory. Some of the debug operations which may be supported by real-time emulation are: setting a software breakpoint and observing the machine state at that point; single step code advance to observe exact instruction by instruction decision making; detecting a spurious write to a known memory location; and viewing and changing memory and peripheral registers.

Real-time emulation facilities are incorporated into a CPU mega-module and are woven into the fabric of CPU core 201. This assures designs using CPU core 201 have sufficient debug facilities to support debugger application program 110 baseline debug, instrumentation, and data transfer capabilities. Each CPU core 201 incorporates a baseline set of emulation capabilities. These capabilities include but are not limited to: execution control such as run, single instruction step, halt and free run; displaying and modifying registers and memory; breakpoints including software and minimal hardware program breakpoints; and watchpoints including minimal hardware data breakpoints.

Figure 4:
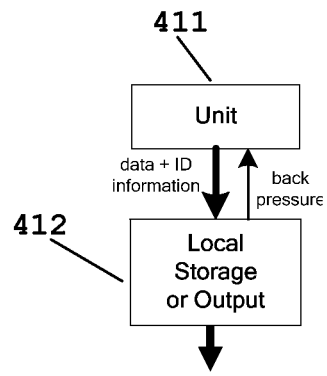
FIG. 4 illustrates a first prior art emulation data gathering system.

FIG. 4 illustrates an embodiment of the prior art. FIG. 4 illustrates a single unit 411 and a single local storage or output 412. Unit 411 supplies emulation or debug data captured from the monitored system as described above and identification (ID) information to local storage or output 412. Local storage or output 412 stores this data and ID information for further use. Local storage or output 412 supplies a back pressure signal to unit 411. Unit 411 is subject to the back pressure signal to control the rate of the data supplied. This is useful at times such as when a receiving external device is not ready for more data and local storage or output 412 has reached its storage capacity.

Figure 5:
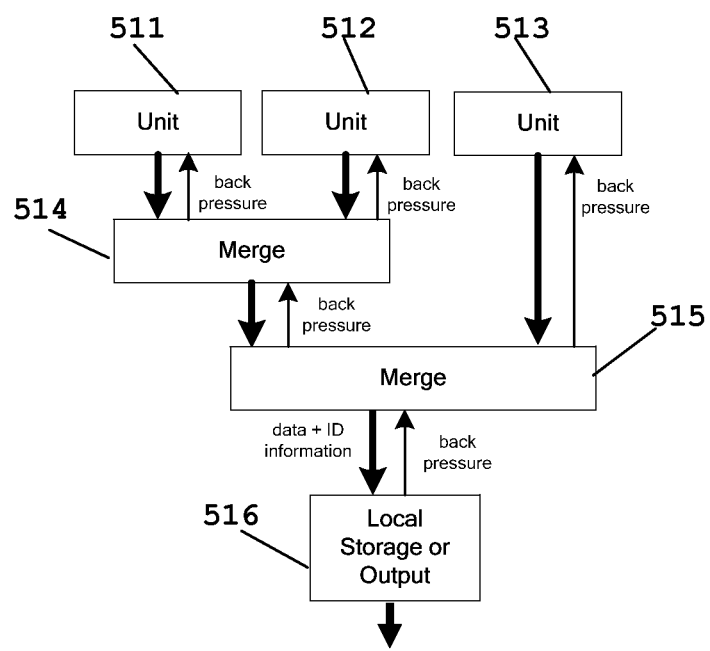
FIG. 5 illustrates another prior art emulation data gathering system.

FIG. 5 illustrates an additional embodiment of the prior art. FIG. 5 illustrates a more complex system than shown in FIG. 4. FIG. 5 illustrates plural units 511, 512 and 513 which supply captured emulation or debug data. Units 511 and 512 supply captured data to first merge unit 514 which combines the two data streams. First merge unit 514 supplies a back pressure signal to each of units 511 and 512 as described above.

The merged data stream output of first merge unit 514 supplies second merge unit 515. First merge unit 514 is subject to a back pressure signal from second merge unit 515. Unit 513 supplies captured emulation and debug data directly to second merge unit 515. Unit 513 is subject to a back pressure signal from second merge unit 515. Second merge unit 515 merges the composite data stream from first merge unit 514 and the data stream from unit 513 into another merged data stream. Second merge unit 515 supplies this further merged data stream to local storage of output 516 and is subject to a back pressure signal from local storage or output 516.

Summarizing the current art, units present their instrumentation data along with source identification information to either a storage or output mechanism (FIG. 4) or to a more complicated merge system before presentation to a storage or output mechanism (FIG. 5). In each of these prior art techniques the instrumentation data generally includes source identification information. The local storage or output may apply back pressure to the source to control the rate of data supply. This data transfer is generally synchronous and sometimes crosses voltage domains.

The clock rate of monitored systems generating instrumentation data is generally higher that the clock rate used to transmit this data. Thus the source can generate more data than can be absorbed by the destination. When merging many sources as shown in FIG. 5 collisions of peak loads generated by multiple sources cannot be handled without losing data. Generally increasing the data transfer bus width does not solve this problem.

In a system where debug is desired, it is often desirable to collect information about system operation with hardware monitors of central processing units (CPUs), direct memory access units (DMAs) and other units. The information generated by these units may be merged into a single stream of instrumentation data. These units may occasionally generate enough information to saturate the stream of instrumentation data without regard to other units sharing the stream. It is also possible that units will simultaneously generate peak output loading. In the prior art data is lost unless units sufficiently buffer data near the source of their instrumentation data.

This invention handles the peak loads and collisions between the loads of multiple sources without power and performance impacts using repeaters. The transfer of instrumentation data is unidirectional. This transfer includes a clock along with data, data size and a valid indication which be propagate toward the local storage or output. One or more repeaters are placed in the path from the unit to the local storage or output. The repeater(s) maintain the high speed timing relationship of the clock, data, data size and valid indication as they are propagated at high data rate from the units to the asynchronous FIFOs.

Figure 6:
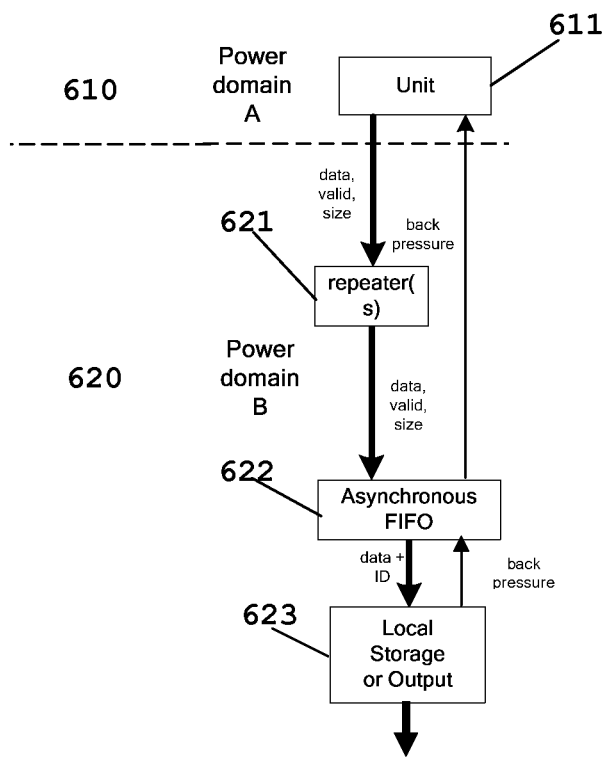
FIG. 6 illustrates a first embodiment of this invention.

FIG. 6 illustrates an embodiment of this invention corresponding generally to the prior art illustrated in FIG. 4. Power domain A 610 includes unit 611. Unit 611 captures emulation and debug data from the monitored system. Unit 611 transmits data, data size and valid indicators across a power domain divide into power domain B 620 to one or more repeaters 621. Repeater(s) 621 maintain the high speed timing relationship of the clock, data, data size and valid indication as transmitted to asynchronous first-in-first-out (FIFO) 622. Unit 611 is responsive to a back pressure signal from asynchronous FIFO 622. Asynchronous FIFO 622 supplies the data and attached identification (ID) information to local storage or output 623.

Figure 7:
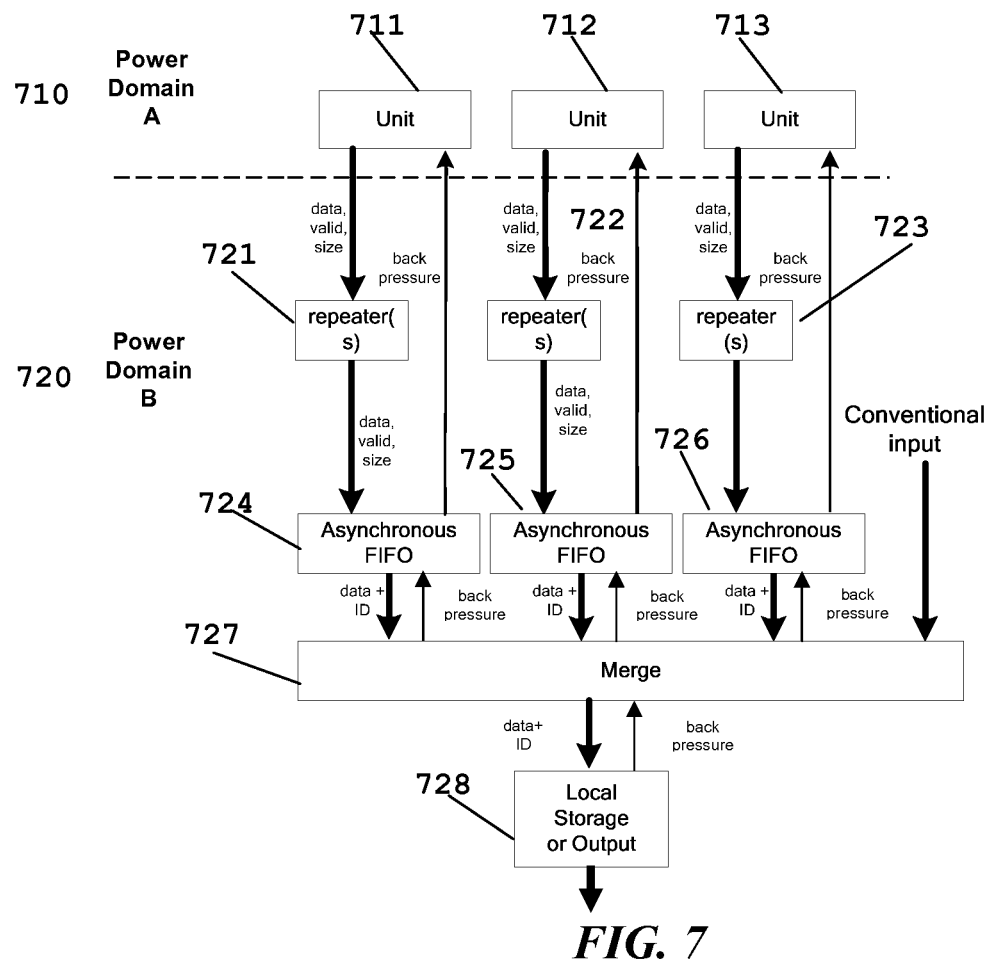
FIG. 7 illustrates a second embodiment of this invention including merged data streams.

FIG. 7 illustrates an embodiment of this invention including data stream merging like the prior art illustrated in FIG. 5. Power domain A 710 includes units 711, 712 and 713. Unit 711 captures emulation and debug data from the monitored system. Unit 711 transmits data, data size and valid indicators across a power domain divide into power domain B 720 to one or more repeaters 721. Repeater(s) 721 maintain the high speed timing relationship of the clock, data, data size and valid indication as transmitted to asynchronous first-in-first-out (FIFO) 724. Unit 711 is responsive to a back pressure signal from asynchronous FIFO 724. Asynchronous FIFO 724 supplies the data and attached identification (ID) information to merge unit 727. Unit 712 captures emulation and debug data and transmits data, data size and valid indicators across a power domain divide into power domain B 720 to one or more repeaters 722. Repeater(s) 722 maintain the high speed timing relationship of the clock, data, data size and valid indication as transmitted to asynchronous first-in-first-out (FIFO) 725. Unit 712 is responsive to a back pressure signal from asynchronous FIFO 725. Asynchronous FIFO 725 supplies the data and attached identification (ID) information to merge unit 727. Unit 713 captures emulation and debug data from the monitored system. and transmits data, data size and valid indicators across a power domain divide into power domain B 720 to one or more repeaters 723. Repeater(s) 723 maintain the high speed timing relationship of the clock, data, data size and valid indication as transmitted to asynchronous first-in-first-out (FIFO) 726. Unit 713 is responsive to a back pressure signal from asynchronous FIFO 726. Asynchronous FIFO 726 supplies the data and attached identification (ID) information to merge unit 727. Merge unit 727 is further responsive to conventional inputs to merge these conventional inputs into the data stream. Merge unit 727 supplies the data and ID information to local storage and output 728.

Figure 8:
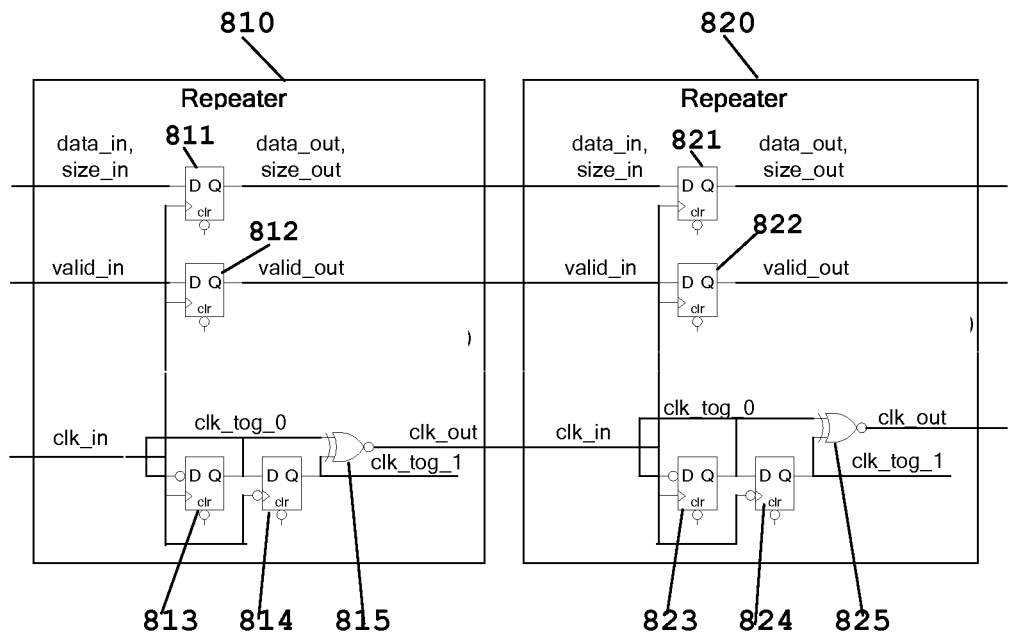
FIG. 8 illustrates a first embodiment of the repeater circuit of FIGS. 6 and 7.

FIG. 8 illustrates a first embodiment of the repeaters. Each repeater 810 and 820 receives data_in, size_in, valid_in and clk_in and outputs data_out, size_out, valid_out and clk_out. Each bit of data_in and size_in is supplied to the D input of a flip-flop. FIG. 8 illustrates representative flip-flops 811 and 821. The valid_in bit is supplied to the D input of respective flip-flops 812 and 822. The clk_in signal is supplied to each clock input of flip-flops 811, 812, 821 and 822. Each bit of data_out and size_out is generated by the Q output of a flip-flop. FIG. 8 illustrates representative flip-flops 811 and 821. The valid_out bit is generated by the Q output put of respective flip-flops 812 and 822. Thus each signal of the data, data size and valid indication is synchronized to the clock by a corresponding flip-flop.

Figure 9:
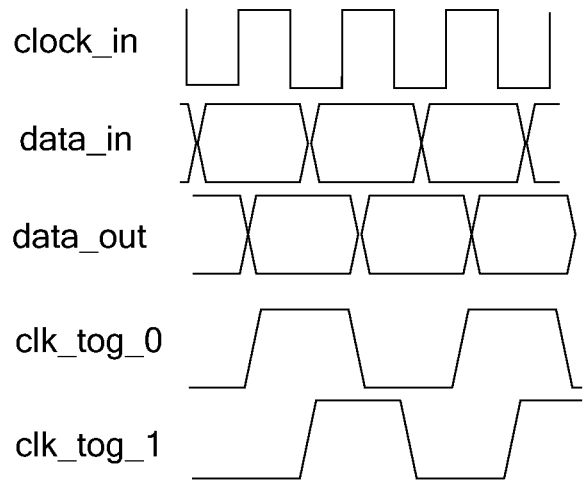
FIG. 9 illustrates waveforms of FIG. 8.

Clk_in is also supplied to the clock input of a cross-coupled flip-flop 813 (823). The Q output of flip-flop 813 (823) supplies an inverting D input of flip-flop 813 (823) and a D input of flip-flop 814 (824). The Q output of flip-flop 813 (823) is a signal clk_tog_0. This signal toggles at half the rate of clk_in. Flip-flop 814 (824) generates a second signal clk_tog_1. The signal clk_tog_1 has the same frequency as clk_tog_0 with a trailing phase due to delays in the flip-flops. See FIG. 9. Exclusive NOR gate 815 (825) recovers the original clock frequency and generates clk_out. This recovers the original rise/fall time of the clock for the next unit.

Figure 10:
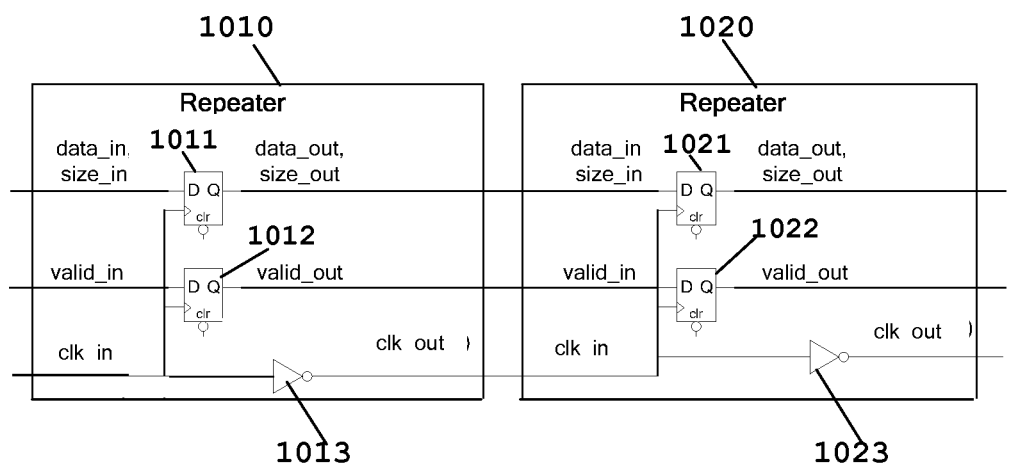
FIG. 10 illustrates a second embodiment of the repeater circuit of FIGS. 6 and 7.

FIG. 10 illustrates an alternative repeater circuit. In FIG. 10 flip-flops 1011 (1021) and 1012 (1022) correspond to respective flip-flops 811 (821) and 812 (822) of FIG. 8. A single inverter 1013 (1023) takes the place of two flip-flops and a Exclusive NOR gate of FIG. 8. Depending upon the routing, inverter 1013 (1023) may provide all the clock regularization needed.

What is claimed is:

1. A monitoring subsystem in an electronic apparatus comprising:
 a plurality of capture units capturing data to be monitored having a output to supply said captured data;
 a repeater corresponding to each of said plurality of capture units having an input connected to said output of said corresponding capture unit and an output for repeating said captured data;
 at least one first-in-first-out buffer corresponding to each of said plurality of capture units having an input connected to said output of said corresponding repeater unit and an output, said first-in-first-out buffer temporarily storing said captured data;
 a first merge unit having inputs connected to said output of said first-in-first-out buffers corresponding to said plurality of capture units and an output of a merged data stream connected to said input of said utilization unit; and
 a utilization unit having an input connected to said output of said first-in-first-out buffer.

2. A monitoring subsystem in an electronic apparatus comprising:
 at least one capture unit capturing data to be monitored having a output to supply said captured data, said captured data including a plurality of data bits, a plurality of size bits indicating a number of said data bits and a clock signal;
 a repeater corresponding to each of said at least one capture unit having an input connected to said output of said corresponding capture unit and an output for repeating said captured data, each repeater including a flip-flop having a D input receiving a corresponding one of said data bits and said data size bits, a clock input receiving said clock signal and a Q output generating a corresponding repeated signal;
 a first-in-first-out buffer corresponding to each of said at least one capture unit having an input connected to said output of said corresponding repeater unit and an output, said first-in-first-out buffer temporarily storing said captured data; and
 a utilization unit having an input connected to said output of said first-in-first-out buffer.

3. The electronic apparatus of claim 2, wherein:
 each repeater further includes
  a first flip-flop having an inverting D input, a clock input receiving said clock signal and a Q output connected to said D input,
  a second flip-flop having a D input connected to said Q output of said first flip-flop, a clock input receiving said clock signal and a Q output, and
  an exclusive NOR gate having a first input connected to said Q output of said first flip-flop, a second input connected to said Q output of said second flip-flop and an output generating a repeated clock signal.

4. The electronic apparatus of claim 2, wherein:
each repeater further includes an inverter having an input receiving said clock signal and an output generating a repeated clock signal.

5. A monitoring subsystem in an electronic apparatus comprising:
at least one capture unit capturing data to be monitored having a output to supply said captured data;
a repeater corresponding to each of said at least one of capture unit having an input connected to said output of said corresponding capture unit and an output for repeating said captured data;
a first-in-first-out buffer corresponding to each of said at least one capture unit having an input connected to said output of said corresponding repeater unit and an output, said first-in-first-out buffer temporarily storing said captured data;
a utilization unit having an input connected to said output of said first-in-first-out buffer;
said at least one capture unit is disposed in a first voltage domain; and
said repeater, first-in-first-out buffer and said utilization device are disposed in a second voltage domain different from said first voltage domain.

6. A method of monitoring an electronic apparatus comprising the steps of:
capturing plural streams of data to be monitored;
repeating each stream of said captured data;
buffering said repeated data in a first-in-first-out buffer;
merging buffered repeated data from plural first-in-first-out buffers; and
utilizing said buffered data from an output of said first-in-first-out buffer.

7. The method of claim 6, wherein:
each stream of data includes a plurality of data bits, a plurality of size bits indicating a number of the data bits and a clock signal; and
wherein said buffering step includes synchronizing the plurality of data bits and the plurality of size bits to said clock signal.

* * * * *